United States Patent
Lisa et al.

(10) Patent No.: US 6,797,185 B2
(45) Date of Patent: Sep. 28, 2004

(54) FILTRATION METHOD FOR GRAFT POLYMER POLYOLS

(75) Inventors: Rudolph E. Lisa, Grosse Ile, MI (US); George Abraham, Birmingham, MI (US)

(73) Assignee: BASF Corporation, Mt. Olive, NJ (US)

(*) Notice: Subject to any disclaimer, the term of this patent is extended or adjusted under 35 U.S.C. 154(b) by 6 days.

(21) Appl. No.: 10/280,421

(22) Filed: Oct. 25, 2002

(65) Prior Publication Data

US 2004/0079709 A1 Apr. 29, 2004

(51) Int. Cl.[7] .............................................. B01D 37/00
(52) U.S. Cl. .................. 210/767; 210/350; 210/387; 210/489; 210/500.26; 210/500.29
(58) Field of Search ................... 210/767, 780, 210/387, 500.29, 500.26, 489, 350; 425/197, 198, 199

(56) References Cited

U.S. PATENT DOCUMENTS

| | | | | |
|---|---|---|---|---|
| 2,679,158 A | * | 5/1954 | Claydon et al. | 73/61.71 |
| 3,855,126 A | * | 12/1974 | Smith | 210/780 |
| 3,940,335 A | * | 2/1976 | Kalman | 210/780 |
| 4,070,293 A | * | 1/1978 | Fogarty, Jr. | 210/401 |
| 4,686,043 A | * | 8/1987 | Yagishita et al. | 210/387 |
| 4,925,560 A | | 5/1990 | Sorrick | 210/387 |
| 5,320,753 A | * | 6/1994 | Keillor et al. | 210/398 |
| 5,556,592 A | * | 9/1996 | Hitchings | 266/227 |
| 5,676,731 A | * | 10/1997 | Hitchings | 75/407 |
| 5,714,067 A | | 2/1998 | Sorrick | 210/490 |
| 6,149,807 A | * | 11/2000 | Previero | 210/236 |
| 6,491,817 B1 | * | 12/2002 | Benesi | 210/227 |
| 2004/0079709 A1 | * | 4/2004 | Lisa et al. | 210/767 |

* cited by examiner

Primary Examiner—Robert James Popovics
(74) Attorney, Agent, or Firm—Fernando A. Borrego; Howard & Howard

(57) ABSTRACT

An index filtration method is disclosed for filtering graft polyol dispersions. The method allows for the rapid filtration of large volumes of graft polyol dispersion in an economical manner. The process can be highly automated. The resulting filtered graft polyol dispersion mainly has particles of 25 microns or smaller and is stable under a variety of conditions for at least 9 weeks.

22 Claims, 1 Drawing Sheet

FILTRATION METHOD FOR GRAFT POLYMER POLYOLS

RELATED APPLICATIONS

None

STATEMENT REGARDING FEDERALLY SPONSORED RESEARCH

Not applicable

BACKGROUND OF THE INVENTION

The present invention relates generally to a method for filtration of polyol dispersions and, more particularly, to an index filtering method for filtration of graft polyol dispersions. Graft polyols are generally defined as vinyl polymer dispersions in polyether polyols and are also known as polymer polyols, as disclosed generally in U.S. Pat. Reissue No. Re. 33,291. Formation of graft polyols generally comprises the in situ polymerization of a polyether polyol having induced unsaturation, commonly known as a macromer, and an ethylenically unsaturated monomer or a mixture of ethylenically unsaturated monomers in the presence of a carrier polyol, a reaction moderator, and a free radical polymerization initiator. Microscopic examination of graft polyol dispersions reveals that they include numerous desirable small particles, these desirable particles are typically in a size range of from 0.1 to 2.5 microns in diameter. Graft polyol dispersions, however, typically also contain particles that may range from 0.04 to 100.0 microns in diameter. The very large particles are not desirable. Graft polyols find great use in polyurethane foaming systems because of the advantageous properties they provide to foams. Many of these desirable characteristics are attributable to the desirable sized particles found in graft polyol dispersions.

One disadvantage with graft polyol dispersions is that during the process of manufacturing them large particles and large aggregates of particles are often formed, both of which are believed to cause great difficulties in typical polyurethane foaming machines utilized to prepare foam from these graft polyols. The problem becomes particularly important when one utilizes carbon dioxide as a blowing agent for the polyurethane foam. The foaming heads of carbon dioxide foam systems have much tighter tolerances than those of typical water-blown, acetone-blown, or chlorinated fluorocarbon-blown foam systems. The carbon dioxide-blown foam machines are particularly useful because of recent concerns about environmental damage from chlorinated fluorocarbon blowing agents, which resulted in environmental regulations that now ban them in the United States.

To alleviate the difficulties that can be caused in a foaming system by the large particles and the large aggregates of graft polyol particles, it is common to pre-filter graft polyols prior to their utilization in a foaming system. Practical considerations require that the graft polyols undergo at least several filtration steps in the typical procedure prior to utilization in a foaming system. Often, the graft polyols are filtered as they are transferred from their storage tanks to tanker trucks or railcars for distribution to foam manufacturers. A second filtration is often carried out as the graft polyol dispersion is unloaded from the railcar or the tanker truck into the foam manufacturer's facility. A third filtration is often carried out as the graft polyol is entering the foam system. For a graft polyol to perform well in most carbon dioxide-blown foam systems it is necessary that the graft polyol pass through the pre-filter of the carbon dioxide foam machine for an extended period of time, typically in excess of 4 hours, without plugging the filter. These filters usually have hole sizes of about 100 microns for Novaflex, manufactured by Hennecke-Bayer, and Beamech machines, and 150 microns for Cardio, manufactured by Cannon-Viking, machines. Typically the pre-filter must be switched when the pressure drop across this pre-filter reaches about 70 psig and manufacturers of foams would like to change these pre-filters as infrequently as possible.

Filtration of graft polyols presents a number of difficulties in part due to the characteristics of graft polyol particles. First, it is necessary to remove only the oversized particles from the graft polyol dispersion, but not the desirably smaller sized particles discussed above because they provide the beneficial characteristics. Most preferably, the filtered graft polyol dispersion will exclude mainly particles having a size of greater than 25 microns with minimal removal of smaller particles. Second, by its nature the carrier polyol in the dispersion is viscous and the presence of the graft polyol particles makes the graft polyol dispersion much more viscous. Graft polyol dispersions are also very sticky. Third, the graft polyol particles tend to be deformable at the filtration temperatures that are used to reduce the viscosity such that they can deform under pressure which leads them to either rapidly plug a typical filter media or to pass through a typical filter media with a defined pore size even though the size of the particle is larger than the pore size. In the present invention it has been found that the use of depth filtration filter media which has a maximum average mean flow pore size in the range of about 15 to 75 microns is preferable with the most preferable being a mean flow pore size ranging from 15 to 50 microns to minimize the plugging in the pre-filters of carbon dioxide blown machines, which as noted above generally have hole sizes in the range of 100 to 150 microns, and is sufficient to insure continuous operation at the foam head. The mean flow pore size as used in the present specification and claims is defined as the diameter of the smallest pore needed free to have half the overall area of the filter sample free. The test for this as defined in ASTM Method F-316. The phenomena that a material filtered through a nominal 25 micron pore size can in fact plug a filter media having much larger holes of from 100 to 150 microns is believed to be attributed to the tendency to bridge or form agglomerates across the holes of the coarser media, which is promoted by large particles, large aggregates of particles, and particle stickiness. Bridging phenomena resulting in plugged filtration media is a well-known phenomenon documented in many filtration references. Furthermore the plugging tendency in the coarser screen can also be promoted by particles and particle aggregates that are larger than the filtration media pores deforming and passing through the filtration media.

In the past, filtration methods for graft polyols have included in-line screen filters, bag filters, and cartridge filters. For the reasons discussed above, however, all of these methods suffer from deficiencies that make them largely impractical for graft polyol dispersions in general. They tend to plug rather rapidly with graft polyol, it is difficult and time consuming to stop the filtration system, remove the plugged filters or unplug the filters or replace them, and then reassemble the filtration system. Typically, to avoid plugging of such filters, they are staged, with the initial stage taking out the coarsest fraction, then a second finer stage removing another finer cut of material. This reduces the frequency of changing of the filter media overall, but still results in a large area requirement. In some cases self-cleaning filters could potentially be used to filter graft polyols. These self cleaning filters, such as from Ronningen-Petter, Inc., have a wiper which cleans the surface of a cylindrical filtration screen continuously to avoid blockage, and the filter periodically purges out the build-up of trapped material. In general, these devices do not use fine enough screens to produce product suitable for carbon dioxide-blown foam machines. When they do have fine screens they suffer from low throughputs, high pressure drops that force particles to deform and pass through the media, and the need to frequently clean the screens which often plug. For many graft polyol dispersions they are effectively impractical.

Because of the difficulties described above it would be advantageous to develop a method for filtration of graft polyols that allowed for rapid filtration of the graft polyol to the appropriate size, significant throughput in the system, ease of filter media replacement, and long-term stability of the filtered graft polyol dispersion.

SUMMARY OF THE INVENTION

In a first embodiment, the present invention is a method for index filtration of a graft polyol comprising the steps of: providing an index filtration system having a first reservoir and a second reservoir; securing a first portion of a depth filtration filter media between the first and second reservoirs and forming a liquid tight seal between the first reservoir and the filter media; introducing a graft polyol dispersion into the first reservoir; receiving the graft polyol dispersion in the second reservoir after it passes from the first reservoir and through the filter media; and moving the used first portion of the depth filtration filter media from between the first and second reservoirs and positioning a second clean portion of the depth filtration filter media between the first and second reservoirs.

In a second embodiment the present invention is a method for index filtration of a graft polyol comprising the steps of: providing an index filtration system having a first reservoir and a second reservoir; securing a first portion of a depth filtration filter media having a mean flow pore size of from 15 to 75 microns between the first and second reservoirs and forming a liquid tight seal between the first reservoir and the filter media; introducing a graft polyol dispersion into the first reservoir; passing the graft polyol dispersion through the filter media and receiving the graft polyol dispersion in the second reservoir after it passes from the first reservoir and through the filter media; and moving the first portion of the depth filtration filter media from between the first and second reservoirs and positioning a second portion of the depth filtration filter media between the first and second reservoirs. Because the present invention utilizes a depth filtration type of filtration media it also removes some particles that are smaller than the smallest pore size via the depth filtration mechanism.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

Figure 1:
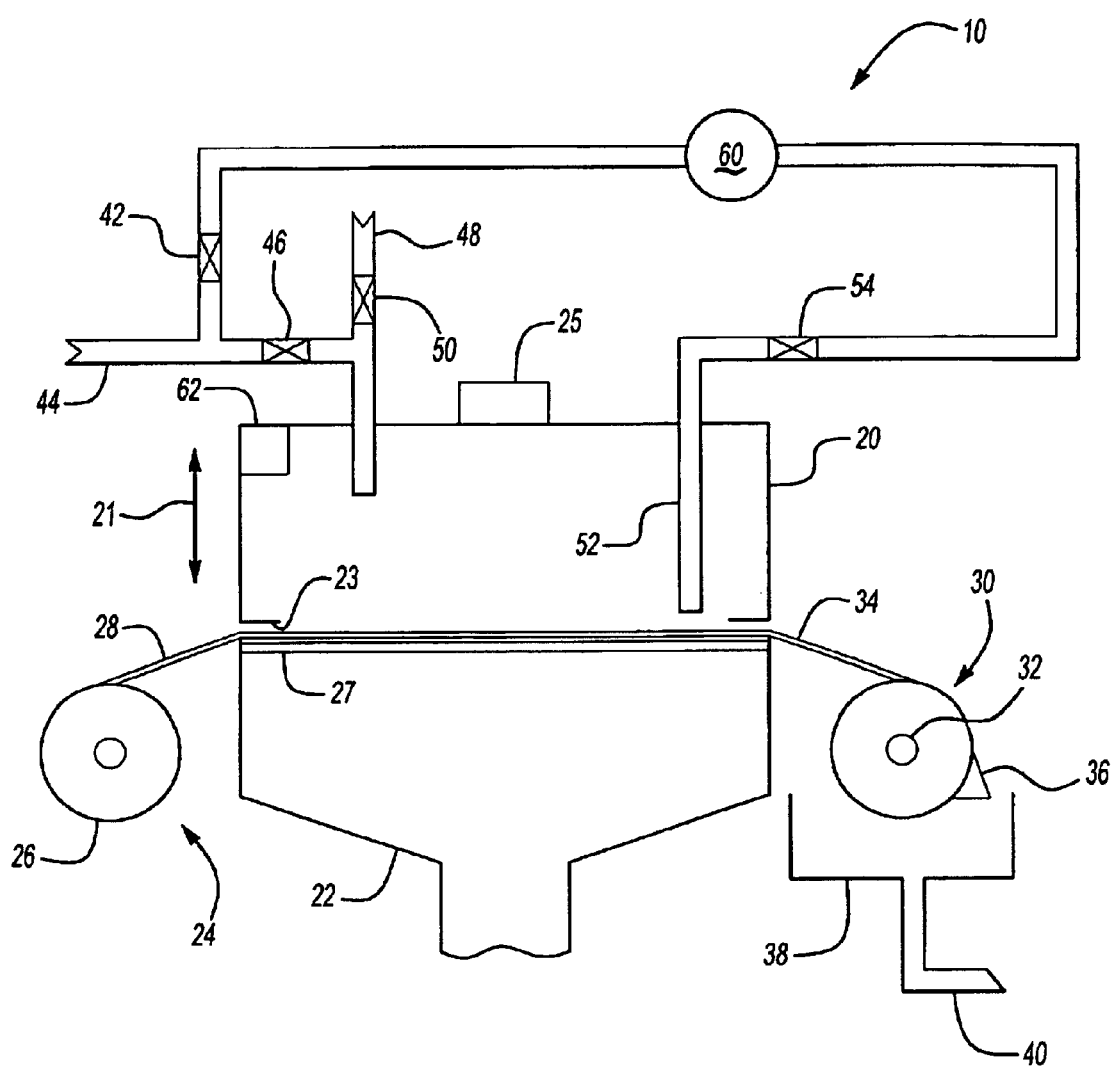
FIG. 1 is a schematic cross-sectional diagram of an index filtration system according to the present invention.

The present invention comprises a process for filtering graft polyols utilizing an index filtration system in a single step. In a typical pressure index filtration system a piece of filter media is moved into position across the filter area by a mechanical system, usually a motorized belt or roller. The index filtration system typically includes a first reservoir and a second reservoir with the filter media positioned between the two reservoirs. Once the filter media is in place the first reservoir is sealed against the filter media to form a liquid tight seal with the filter media. Typically, a perforated plate covering the second reservoir is also sealed against the filter media to form a liquid tight seal with the filtered media; however, this is not always necessary. The graft polyol dispersion to be filtered is then introduced into the first reservoir and the dispersion passes through the filter media using the liquid head as the driving force. The first reservoir will begin to fill with dispersion when the rate of passage through the filter media is lower than the feed rate into the first reservoir, typically because the filter media begins to plug thereby slowing the rate of filtration. The length of time a user can continue to introduce dispersion into the first reservoir before this occurs varies depending on the dispersion and the filter media. This period of introducing dispersion can last a very short time, or run a long time if the dispersion is not too viscous, and the filterability good. As the first reservoir fills the pressure on the system begins to rise because the gas is compressed above the dispersion. This increase in pressure is sensed by the system and the feed to the first reservoir is stopped automatically. At that point, additional pressure is applied to the remaining dispersion in the first reservoir thereby forcing it through the filter media for collection in the second reservoir. Typically, the pressurization is accomplished utilizing air or nitrogen gas at pressures of from 20 to 150 pounds per square inch (psi). Once the majority of the dispersion to be filtered has passed through the filter media "breakthrough" occurs, i.e. a rapid depressurization due to depletion of the dispersion from the first reservoir. Following breakthrough most index filtering systems enter a drying time cycle which may include raising the pressure of the gas to force as much of the dispersion through the filter media as possible. After the drying cycle, the additional gas pressure is stopped and the excess pressure is then released by opening a vent valve. The first reservoir is removed from the filter media and the filter media is moved or indexed to provide a clean unused portion of filter media between the first and second reservoir so that the filtration cycle can be repeated. If the filtration media plugs during filtration and dispersion is trapped above the filter media, then no breakthrough occurs. The gas pressure remains at its maximum pressure and no further gas enters. After a period of time called a long dry cycle time, the system typically senses this, and the venting valve opens on a vent tube. The excess dispersion exits the first reservoir via the vent tube and is collected in a chamber for later recycling. Occasionally the index filtration system also includes a scraper on a take-up roller for the used filter media to recover some of the dispersion on the surface of the filter media that did not get filtered for recycling through the system. This can be important if the recovered dispersion is valuable, and the dispersion is fairly viscous, such as is the case with graft polyol dispersions. Because this recovered dispersion contains many of the oversized particles, it typically needs to be coarsely filtered in some manner before refiltering through the indexing filter system or it needs to be used in non-carbon dioxide-blown foaming applications. The typical index filtration system is highly automated, often has the ability to automatically adjust the feed and drying cycles when dispersion filterability varies, has a rapid cycle time, and is particularly useful in the present invention.

A schematic diagram of a simplified pressure index filtration system according to the present invention is shown generally at 10 in FIG. 1. System 10 includes a first reservoir 20 having a sealing surface 23 and a second reservoir 22. Optionally, the second reservoir 22 includes a perforated plate 27. A filter media control assembly is shown generally at 24. The control assembly 24 typically includes a source of clean filter media 26, which is generally in the form of a roll. The control assembly 24 feeds a clean filter media 28 between the first reservoir 20 and the second reservoir 22 and is supported by the plate 27, if present. The control assembly 24 also includes a used filter media collector shown generally at 30. The filter media 28 is typically conveyed either by a motor driven belt or by a motor on the used filter media collector 30. When the belt (not shown) is employed, the used filter media 34 usually is dropped loosely into a collection bin. Typically when a drive motor on the used filter media collector 30 is used, the collector 30 comprises a roller 32 that the control assembly 24 uses to accumulate used filter media 34. The used filter media collector 30 also optionally includes a scraper assembly 36 which is biased against the used filter media 34 and scrapes any unfiltered graft polyol dispersion from the surface of the used filter media 34 for collection in a third reservoir 38. In a typical control assembly 24 the source of clean filter media 26 and the used filter media collector 30 are operated by at least one motor (not shown) providing for rapid indexing of the clean filter media 28 in the system 10. Either method for collection of the used filter media 34 is suitable for the present invention, but if the belt system is used the used filter media 34 can not be scrapped to recover dispersion from its surface.

An inlet line 44 feeds graft polyol to be filtered through a valve 46 into first reservoir 20. A gas inlet 48 is connected through a valve 50 to inlet line 44 to provide the pressurized gas. System 10 further includes a recovery or vent tube 52 located very near the bottom of the first reservoir 20 that is connected through a vent valve 54 and a pump 60 to the inlet line 44 to recover unfiltered graft polyol dispersion. The third reservoir 38 is connected through tubing 40 to another collection torch (not shown). This can then either be course filtered and sent through the system 10 or used in other foaming systems that are less demanding. The first reservoir 20 includes a pressure transducer 62 to sense an increase in pressure when the filter media 28 begins to plug.

System 10 further includes a reservoir control mechanism 25 for moving the first reservoir 20 relative to the second reservoir 22 as shown by arrow 21. The control mechanism 25 can comprise any of a variety of known mechanisms including a pneumatic mechanism for raising and lowering the first reservoir 20, a hydraulic mechanism for raising and lowering first reservoir 20, or a geared mechanism for raising and lowering first reservoir 20. Such systems are widely available.

A variation on the design shown in FIG. 1 is available wherein the first and second reservoirs 20, 22 do not move relative to each other. Rather a seal, usually filled with a liquid, is located between the two reservoirs and it is pressurized to form a seal between the filter media 28 and the first reservoir 20. When the seal is depressurized, the tension on the filter media 28 is released, the filter media 28 is now free to move and can be indexed by either a motorized roll or belt. These alternative pressure index filtration systems are available from Filtra Systems Company of Farmington Hills, Mich., USA.

Those skilled in the art will recognize that some highly filterable graft polyol dispersions may allow for other indexing filtration equipment to be used. Some graft polyol dispersions with sufficiently high filterability may require less than a 14.7 psig pressure drop across the filter media 28 to obtain a highly filtered dispersion while operating at high rates of filtration and low enough filter media 28 usage. Such dispersions can be filtered with a vacuum indexing filter system wherein the driving force for filtration is a vacuum pulled through the filter media 28. In this sort of a system, the dispersion to be filtered is contained in a first reservoir on one side of the filter media, and the filter media is sealed against a second reservoir on the opposite side of the filter media. The second reservoir is under a vacuum. In this embodiment, the dispersion is pulled by the vacuum into the second reservoir and then out of the system. When the filter media is partially blocked, the vacuum in the second reservoir rises, the system senses this change, and initiates an index of the filter media. The advantage to these systems is that it is generally less expensive than a pressure indexing system 10 as shown in FIG. 1. Again, those skilled in the art can determine if a particular graft polyol dispersion can be coupled with a filter media for a vacuum indexing filter system. Such vacuum indexing systems are made, for example, by Henry Filter Company, Incorporated of Bowling Green, Ohio, USA and Filtra Systems Company of Farmington Hills, Mich., USA.

In operation of the system 10, the reservoir control mechanism 25 moves the first reservoir 20 away from the second reservoir 22 as a first step in the process. Valves 42, 50, and 54 are closed. The filter media control assembly 24 advances clean filter media 28 between first reservoir 20 and second reservoir 22. The used filter media collector 30 collects the used filter media 34 on the roller 32. The reservoir control mechanism 25 then moves the first reservoir 20 against the clean filter media 28 in a liquid tight sealing manner against sealing surface 23. The liquid tight seal can be accomplished by hydraulic pressure, an inflatable bladder, or other seal on the sealing surface 23 as is known in the art. Alternatively, the control mechanism 25 may exert sufficient pressure on the first reservoir 20 such that it tightly clamps the clean filter media 28 between itself and the second reservoir 22 in a liquid tight manner. The feed cycle begins when the graft polyol dispersion is introduced into the first reservoir 20 through inlet line 44 and valve 46 and the dispersion level begins to rise, filling the first reservoir 20. The dispersion passes through the filter media 28 into the second reservoir 22 both by gravitational force and pressure increase due to loss of headspace in the first reservoir 20. The level of dispersion in the first reservoir 20 eventually begins to rise because of plugging of the filter media 28 thereby beginning to fill the first reservoir 20 even more. When this occurs a pre-set pressure is eventually reached in the first reservoir 20 and valve 46 is closed. Optionally the dispersion can be introduced for a pre-set time rather than until a pre-set pressure is reached. Then valve 50 is opened and gas pressure through gas inlet 48 is applied to the graft polyol dispersion in the first reservoir 20. At this point the graft polyol dispersion passes through the clean filter media 28 into the second reservoir 22 due to the pressure coming through air inlet 48. This is called the initial drying cycle. When the majority of the graft polyol has passed through the filter media 28 and into second reservoir 22 "breakthrough" occurs, which is a sudden drop in pressure. This drop in pressure is sensed by the system 10 which then enters a final drying cycle wherein for a period of time valve 50 remains open to push the last of the graft polyol through the filter media 28 into second reservoir 22. Then the vent or recovery valve 54 is opened and any remaining pressure in the first reservoir 20 is relieved. In the case where dispersion is trapped above the filter media 28, i.e. where breakthrough did not occur, it leaves via the recovery tube 52. The vented material can be collected in a separate collection vessel or in a reservoir 38, where scrapings are collected. After the final drying cycle has completed the first reservoir 20 is moved out of liquid tight engagement with the filter media 28, typically by raising it, and the filter media control assembly 24 indexes clean filter media 28 into position between the first reservoir 20 and the second reservoir 22. The used filter media 34 is collected by the used filter media collector 30 as described above. The scraper assembly 36 removes unfiltered graft polyol from the top of used filter media 34 for collection in the third reservoir 38.

Selection of the proper filter media 28 is very important for the efficiency of the present invention. In using the present invention the filter media 28 is selected to provide depth filtration as opposed to surface filtration or cake filtration. In a surface filtration system the filter media generally has a well-defined constant hole size and is often a monofilament single layer woven mesh. A surface filter media operates by straining out particles that are larger than the hole size and allowing only particles that are smaller than the hole size to pass through. Such a filtration media would more rapidly be blinded or plugged by the graft polyols in the present invention. Thus, surface filtration type filter media are unsuitable for the present invention. A cake filtration system is one wherein a cake of particles accumulates on the surface of the filter media. In fact, it is the cake of particles accumulating on the surface of the filter media that actually accomplishes the filtration.

By way of contrast a filter media 28 capable of depth filtration is generally either a non-woven multi-layer material or a needled felt material. Although impractical for the present invention, deep bed sand filters operate on a similar principle. Depth filtration occurs when particles are trapped within the depth of the media 28, even though the particles themselves are much smaller than the flow channels or pores through the media 28. The mechanisms responsible for this filtration are complex and include attractions between the walls of the pores of the filter media 28 and the particles, attraction between adjacent particles, attraction by van der Waals and other type surface forces. Depth filtration allows one to use a filter media 28 with large enough pores to provide sufficient throughput while at the same time to capture on the pore walls and remove from the dispersion particles that are smaller than the pore size of the filter media 28. The particles whose size is larger than the pore size are strained out on the surface of the filter media 28. Another important component to the filter media 28 of the present invention is that it has sufficient thickness to provide for a sufficient period of depth filtration. For the present invention the important parameters for the depth filtration filter media 28 used are that it has a mean flow pore size of from 15 to 75 microns and more preferably from 15 to 50 microns and sufficient thickness. As described below this can be accomplished using thicker filter media 28 with a larger mean flow pore size or thinner filter media 28 with a smaller mean flow pore size.

One series of filter media 28 that have been found to be useful with a wide variety of graft polyols is available from Crystal Filtration Company as Crystal 2220. The filter media 28, Crystal 2220, is a non-woven, wet laid, multi-layer media 28 comprising: a top layer of polyester; a middle layer of 97% cellulose and 3% microglass, which is ground fiberglass mixed with paper pulp; and a bottom layer of polyester. The top layer, which the graft polyol passes through initially, has a medium pore size while the middle layer has the tightest pore size. The bottom layer has a large pore size to allow the filtered graft polyol to quickly pass through. The filter media 28 preferably has a thickness of approximately 0.06 inches giving it a mean flow pore size of approximately 25 microns. Another series of suitable filter media 28 available from Crystal comprise the needled felts such as the Crystal 3195s and the Crystal 3220s series. These needled felts have a thickness of approximately 0.25 inches and a mean flow pore sizes of 42 to 49 microns. Another useful filter media is Crystal 510 with a mean flow pore size of about 18 microns. The mean flow pore size, while an important measure, is not the sole selection criteria for a filter media 28. As can be seen from the discussion above, the mean flow pore size can vary between at least 18 and 49 microns and still provide suitable filtration of graft polyols provided that the thickness of the filter media 28 is sufficient to provide the depth filtration necessary in the present invention. It is believed that with appropriate thickness even a mean flow pore size of 75 microns or more may be used in the present invention, particularly if the foaming system has a larger pre-filter hole size. Preferably the filter media 28 has a thickness of from 0.04 to 0.3 inches to provide sufficient depth filtration.

Another important aspect of the present invention is the temperature at which the graft polyol dispersion is introduced onto the filter media 28 in the first reservoir 20. The viscosity of graft polyol dispersions can be extremely high and increasing the temperature reduces the viscosity. This can be accomplished in a number of ways including preheating the graft polyol dispersion prior to loading it into the first reservoir 20 and/or also heating the first reservoir 20. For the present invention it is advantageous to have a temperature of the graft polyol dispersion being filtered of from 25 to 98° C. More preferably, the temperature of the graft polyol dispersion to be filtered is from 50 to 80° C. The pressure applied to the first reservoir 20 in a pressure index filtration system through air inlet 48 may range from 20 to 150 psi, more preferably from 20 to 80 psi, and most preferably from 20 to 50 psi. Obviously, in a vacuum index filtration system as described above the vacuum pressure is generally less than 20 psig.

Numerous other filter media 28 providing depth filtration are also suitable for use in the present invention. Suitability of a proposed filter media 28 can be assessed rapidly utilizing a batch laboratory pressure filter system, as is known by those of ordinary skill in the art. The key variables include the filtration rate per unit area, the amount of dispersion processed before the filter media becomes plugged, and the final quality of the filtrate. The quality is generally measured as its tendency, when mixed with a standard foaming recipe to plug an approximately 100 micron pore size screen. A standard foaming recipe will generally include the following components: graft polyol dispersion, a conventional polyol, catalysts, surfactants, and activators. To make a foam, the recipe is than mixed with at least one polyisocyanate and the carbon dioxide blowing agent.

EXAMPLE 1

A truckload of commercial Pluracol® 1442 graft polyol from BASF Corporation was collected in a tanker truck. Pluracol® 1442 is a secondary hydroxyl-terminated graft polyether triol with approximately 43% solids of copolymerized styrene and acrylonitrile. The temperature of the Pluracol® 1442 in the tanker truck was heated to a temperature of from 52 to 54° C. utilizing a steam coil. The outlet of the tanker truck was connected to the inlet line 44 of the index filtration system 10. The inlet line 44 and the connection to the tanker truck was maintained at the appropriate temperature using water-jacketed hoses. The index filtration system 10 had a filtration area that was 20 inches by 17.25 inches providing 2.4 square feet of filtration area. The filtration system 10 was utilized with a filter media 28 comprising Crystal 3195s from Crystal Filtration Company. The filter media 28 had a thickness of 3/16 inch and the bottom side of the filter media 28 was singed to prevent sloughing of the filter media 28 into the filtered graft polyol. This filter media 28 is a needled felt of 100% polyester. Eleven gallons per index cycle of graft polyol dispersion was introduced into the first reservoir 20 at a rate of 7 gallons per minute. The graft polyol dispersion was pushed through the filter media 28 and collected in the second reservoir 22 over a period of approximately one-minute after the feed was stopped, with 40 psi of air pressure from gas inlet 48. A two-minute dry cycle as described above, was utilized to dry the filter media 28 and the pressure through the gas inlet 48 was maintained at 40 psi. The used filter media 34 was scraped with scraper assembly 36 into reservoir 38 and the recovered graft polyol dispersion was saved for future processing as described above. Dispersion trapped above the filter media 28 when no breakthrough occurred was saved for future filtration. The filtration system 10 was capable of filtering 1,100 pounds per hour of the graft polyol dispersion and the entire tanker truck was filtered in approximately 37 hours. There was a yield loss of 1.6% of the Pluracol® 1442 in the used filter media 34. Utilizing the filtered Pluracol® 1442 with a standard foaming recipe according to the present invention the 150-micron pre-filter on a foam machine performed without a plug for over 40 hours while the Pluracol® 1442 filtered by previous means of a Ronningen-Petter self-cleaning filter with a 50 micron by 500 micron wedgewire screen would plug in about one to two hours.

EXAMPLE 2

A tanker truck of Pluracol® 1543, from BASF Corporation, was prepared. Pluracol® 1543 is a secondary hydroxyl-terminated graft polyether triol containing approximately 44% solids of copolymerized styrene and acrylonitrile. The tanker truck was connected to the filtration system 10 as described above in Example 1 with the difference that the index filtration system 10 had a filtration area of 7 square feet. The filter media 28 utilized was a tri-laminate from Crystal Filtration Company, designated Crystal 2220. This filter media 28 is a non-woven, tri-laminate, wet-laid paper similar to that described in U.S. Pat. No. 4,925,560. The filter media 28 comprises: a top layer of 100% polyester; a middle layer of 97% cellulose and 3% microglass, a ground fiberglass mixed with pulp; and a bottom layer of polyester. The Crystal 2220 filter media 28 has a mean flow pore size of approximately 25 microns and a thickness of 0.06 inches. The Pluracol® 1543 was introduced at a rate of 22 gallons per minute into the first reservoir 20 and 15 gallons were used per index cycle. The temperature of the Pluracol® 1543 was 65° C. The drying cycle was approximately 2.5 minutes and the Pluracol® 1543 could be processed at a rate of 2,450 pounds per hour with a total processing time for the tanker truck of 18.3 hours. The filtered Pluracol® 1543 was foamed on a Hennecke foam machine utilizing a standard foaming formulation and unlike previous Pluracol® 1543 filtered in a Ronningen-Petter self-cleaning filter with a 50 micron by 500 micron wedgewire screen, which would plug in about 15 minutes, the foam system did not plug during the foaming process.

EXAMPLE 3

A tanker truck of commercial Pluracol® 2130 from BASF Corporation was prepared. Pluracol® 2130 comprises a primary hydroxyl-terminated graft polyether triol dispersion containing approximately 31% solids of copolymerized styrene and acrylonitrile. The Pluracol® 2130 was introduced into to a filtration system 10 as described above in Example 2. The filter media 28 utilized was the same as that in Example 1. The filtration system 10 was set to filter 95 gallons per index with a loading rate of 24 gallons per minute, and the temperature of the feed of Pluracol® 2130 into the first reservoir 20 was approximately 75° C. The drying cycle lasted 40 seconds. The Pluracol® 2130 could be filtered at a rate of 12,700 pounds per hour.

Utilizing the system 10 described above and the filter media 28 described in Examples 1, 2, and 3, the system 10 could be utilized to filter a wide variety of graft polyol dispersions. Laboratory scale filtration studies show that graft polyol dispersions which could be successfully filtered utilizing the above-described system 10 include the following BASF Corporation products: Pluracol® 1543; Pluracol® 2145; Pluracol® 2130; Pluracol® 2115; Pluracol® 1528; Pluracol® 973; Pluracol® 1218; Pluracol® 1525; Pluracol® 1442; Pluracol® 1524; and Pluracol® 1365.

Stability of the filtered graft polyols after filtration utilizing system 10 was investigated in two ways. In a first test, a sample of the filtered graft polyol was stored at room temperature for up to nine weeks with samples taken every week. Each sample was evaluated to determine if it retained its filtration characteristics. Because the amount of sample was limited, an estimate of filterability was determined by measuring how much dispersion at a temperature of 60° C. would pass through a 28 micron hole size screen under 40 psig before the screen was plugged. The filterability, within experimental error, did not change over the nine weeks. In a second test to simulate a condition of temperature fluctuations, a sample was placed in an autoclave and put on a six-hour cycle wherein the sample was heated to 77° C. and allowed to cool to 43° C. over a six-hour period and then the cycle was repeated for a 9 week period. The sample was also agitated at a rate of 50 rpm during the heating portion of each cycle. In both instances the filtered graft polyol was stable with no change in its ability when heated to 60° C. to pass through a 28 micron hole size screen over a period of nine weeks.

The foregoing invention has been described in accordance with the relevant legal standards; thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A method for index filtration of a graft polyol comprising the steps of:
   a) providing an index filtration system having a first reservoir and a second reservoir;
   b) securing a first portion of a depth filtration filter media between the first and second reservoirs and forming a liquid tight seal between the first reservoir and the filter media;

c) introducing a graft polyol dispersion into the first reservoir;

d) passing the graft polyol dispersion through the filter media and into the second reservoir; and e) moving the first portion of the depth filtration filter media from between the first and second reservoirs and positioning a second portion of the depth filtration filter media between the first and second reservoirs.

2. The method of claim 1, wherein step b) comprises compressing the filter media between the first reservoir and the second reservoir to form the liquid tight seal.

3. The method of claim 1, farther comprising the step of applying pressure to the graft polyol dispersion while it is in the first reservoir to drive the graft polyol dispersion through the filter media and into the second reservoir.

4. The method of claim 3, comprising applying a pressure of from 20 to 150 pounds per square inch to the graft polyol dispersion in the first reservoir.

5. The method of claim 3, comprising applying a pressure of from 20 to 80 pounds per square inch to the graft polyol dispersion in the first reservoir.

6. The method of claim 3, comprising applying a pressure of from 20 to 50 pounds per square inch to the graft polyol dispersion in the first reservoir.

7. The method of claim 1, wherein step c) further comprises providing the graft polyol solution at a temperature of from 25 to 98 degrees Celsius while introducing it into the first reservoir.

8. The method of claim 1, wherein step c) further comprises providing the graft polyol solution at a temperature of from 50 to 80 degrees Celsius while introducing it into the first reservoir.

9. The method of claim 1, wherein step b) comprises securing a depth filtration filter media comprising a layer of 97% cellulose and 3% microglass between the first and second reservoirs.

10. The method of claim 9, wherein step b) comprises securing a depth filtration filter media comprising a layer of polyester and a layer of 97% cellulose and 3% microglass between the first and second reservoirs.

11. The method of claim 9, wherein step b) comprises securing a depth filtration filter media comprising a first layer of polyester, a second layer adjacent the first layer comprising 97% cellulose and 3% microglass, and a third layer adjacent the second layer between the first and second reservoirs, wherein the third layer has a pore size that is greater than that of the first layer and the first layer has a pore size that is larger than that of the second layer.

12. The method of claim 1, wherein step b) comprises securing a depth filtration filter media comprising a needled felt between the first and second reservoirs.

13. The method of claim 12, wherein step b) comprises securing a depth filtration filter media comprising a needled felt having a singed side between the first and second reservoirs.

14. The method of claim 1, wherein step b) comprises securing a depth filtration filter media having a mean flow pore size of from 15 to 75 microns between the first and second reservoirs.

15. The method of claim 1, wherein step b) campuses securing a depth filtration filter media having a mean flow pore size of from 15 to 50 microns between the first and second reservoirs.

16. The method of claim 1, wherein step b) comprises securing a depth filtration filter media having a thickness of from 0.04 inches to 0.3 inches between the first and second reservoirs.

17. The method of claim 1, wherein step b) comprises securing a depth filtration filter media having a thickness of from 0.06 inches to 0.15 inches between the first and second reservoirs.

18. The method of claim 1, wherein step e) further comprises removing graft polyol dispersion from the first portion of the depth filtration filter media as the first portion is being moved from between the first and second reservoirs.

19. The method of claim 18, further comprising collecting the removed graft polyol dispersion and loading it into the first reservoir.

20. The method of claim 1 wherein step a) comprises providing a pressure index filtration system.

21. The method of claim 1 wherein step a) comprises providing a vacuum index filtration system.

22. A method for index filtration of a graft polyol comprising the steps of:

a) providing an index filtration system having a first reservoir and a second reservoir;

b) securing a first portion of a depth filtration filter media having a mean flow pore size of from 15 to 75 microns between the first and second reservoirs and forming a liquid tight seal between the first reservoir and the filter media;

c) introducing a graft polyol dispersion into the first reservoir;

d) passing the graft polyol dispersion through the filter media and into the second , reservoir; and e) moving the first portion of the depth filtration filter media from between the first and second reservoirs and positioning a second portion of the depth filtration filter media between the first and second reservoirs.

* * * * *